(12) United States Patent
Debnath et al.

(10) Patent No.: US 11,151,095 B2
(45) Date of Patent: Oct. 19, 2021

(54) CLOUD-SCALE FILE-BASED FILESYSTEM FOR HYBRID CLOUD STORAGE

(71) Applicant: VMWARE, INC., Palo Alto, CA (US)

(72) Inventors: Sajal Debnath, Bengaluru (IN); Nitin Mishrauliya, Bengaluru (IN); Prasanna Shetty, Bengaluru (IN)

(73) Assignee: VMWARE, INC., Palo Alto, CA (US)

( * ) Notice: Subject to any disclaimer, the term of this patent is extended or adjusted under 35 U.S.C. 154(b) by 642 days.

(21) Appl. No.: 15/679,184

(22) Filed: Aug. 17, 2017

(65) Prior Publication Data

US 2019/0005065 A1 Jan. 3, 2019

(30) Foreign Application Priority Data

Jun. 30, 2017 (IN) .............................. 201741023170

(51) Int. Cl.
| | | |
|---|---|---|
| *G06F 16/10* | (2019.01) | |
| *G06F 16/185* | (2019.01) | |
| *G06F 16/182* | (2019.01) | |
| *H04L 29/08* | (2006.01) | |

(52) U.S. Cl.
CPC .......... *G06F 16/185* (2019.01); *G06F 16/182* (2019.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 9,898,205 | B1* | 2/2018 | Kaliannan | G06F 3/0611 |
| 2010/0287205 | A1* | 11/2010 | Foltz | G06F 16/137 |
| | | | | 707/802 |
| 2014/0006465 | A1* | 1/2014 | Davis | G06F 16/183 |
| | | | | 707/827 |
| 2014/0164449 | A1* | 6/2014 | Kim | G06F 16/188 |
| | | | | 707/827 |
| 2015/0261781 | A1* | 9/2015 | Hunter | H04L 67/32 |
| | | | | 707/704 |
| 2015/0324381 | A1* | 11/2015 | Brand | G06F 21/6218 |
| | | | | 707/829 |

\* cited by examiner

*Primary Examiner* — Kristopher Andersen
(74) *Attorney, Agent, or Firm* — Su IP Consulting

(57) ABSTRACT

A method is provided for a file-based filesystem. The method includes mounting storage devices, periodically ranking the mounted storage devices, exporting a directory in a native filesystem as a share, receiving a first request to make a directory in the share, and, in response to the first request, making the directory in the store by storing information about the directory in a database without making the directory in the native filesystem. The method includes receiving a second request to write a file in the share and, in response to the second request, writing the file in the share by selecting a highest-ranking mounted storage device, storing information about the file in the database, and writing the file with a unique identifier as its file name in a root directory of the selected storage.

20 Claims, 17 Drawing Sheets

| name | type | parent | location | uuid | p_uuid |
|---|---|---|---|---|---|
| dir1 | directory | root | NULL | d46d219e-766f-44c7-8f19-1c033a83e752 | NULL |
| dir2 | directory | root | NULL | 5dbec573-3c42-46c2-83b3-7f02b40a640b | NULL |
| dir3 | directory | dir1 | NULL | 9b90562c-6c63-451a-b99d-9e124401ae6 | d46d219e-766f-44c7-8f19-1c033a83e752 |
| dir4 | directory | dir2 | NULL | 5594dedf-c9e5-4a3d-83ef-6f62921 5bba1 | 5dbec573-3c42-46c2-83b3-7f02b40a640b |
| dir1 | directory | dir4 | NULL | bb87313a-68f4-4697-addc-cd45d47beea1 | 5594dedf-c9e5-4a3d-83ef-6f62921 5bba1 |
| dir2 | directory | dir3 | NULL | 32efaa6-0a07-43c9-8c9b-601eed723abb | 9b90562c-6c63-451a-b99d-9e124401ae6 |
| file1 | file | root | local1 | 4205 14f2-ce5a-4bfc-a1 82-bb3f6dd5d81 | NULL |
| file2 | file | dir1 | local1 | cd653e21-df50-4101-8add-e5b013214924 | d46d219e-766f-44c7-8f19-1c033a83e752 |
| file2 | file | dir1 | local2 | 93b899c6-2bcc-4b5a-99a8-d0498bd46811 | bb87313a-68f4-4697-addc-cd45d47beea1 |
| file5 | file | dir3 | local1 | 12235180-4590-4b05-9fee-12a1ef8c5023a | 9b90562c-6c63-451a-b99d-9e124401ae6 |
| file6 | file | dir4 | local1 | 9d53f49f-ea20-4477-b72b-79a91b09f603 | 5594dedf-c9e5-4a3d-83ef-6f62921 5bba1 |

FIG. 3

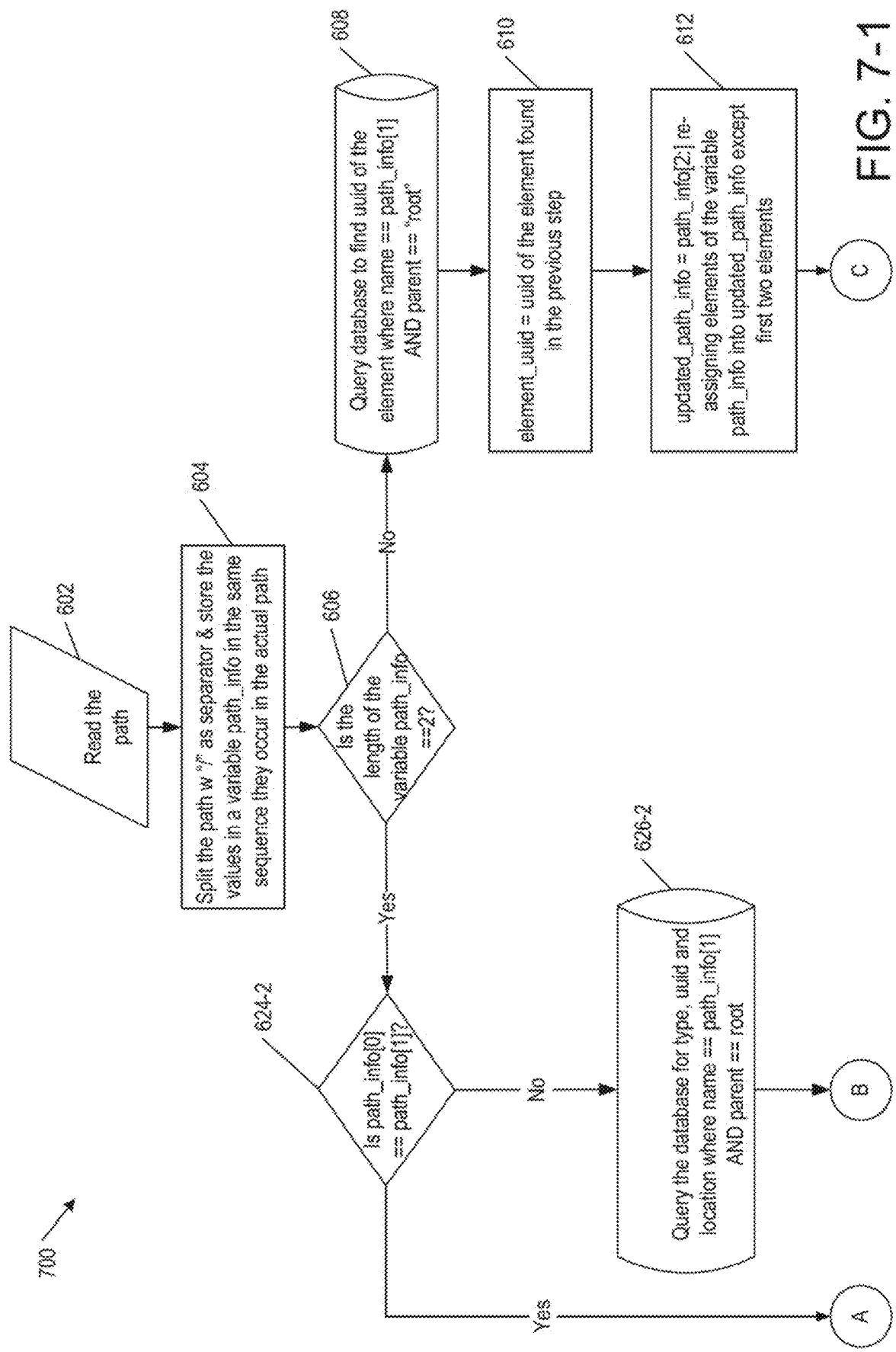

| name | type | parent | location | uuid | p_uuid |
|---|---|---|---|---|---|
| dir1 | directory | root | NULL | d46d219e-766f-44c7-8f19-1033a83e752 | NULL |
| dir2 | directory | root | NULL | 5dbee573-3c42-46c2-83b3-7f02b4d0b400 | NULL |
| dir3 | directory | dir1 | NULL | 9b9056c2c-6c63-451a-b99d-9e12440f1ae6 | d46d219e-766f-44c7-8f19-1033a83e752 |
| dir4 | directory | dir3 | NULL | 5594dedf-c9e5-4a3d-83ef-6f62921bba1 | 9b9056c2c-6c63-451a-b99d-9e12440f1ae6 |
| dir5 | directory | dir4 | NULL | 5dbee573-3c42-46c2-83b3-7f02b4d0b400 | 5594dedf-c9e5-4a3d-83ef-6f62921bba1 |
| dir3 | directory | dir2 | NULL | c32efaa6-0a07-43c9-8e9b-601eed723abb | 5dbee573-3c42-46c2-83b3-7f02b4d0b400 |
| dir4 | directory | dir3 | NULL | 42051462-ce5a-4bfc-a182-bb3f6ad85d81 | c32efaa6-0a07-43c9-8e9b-601eed723abb |
| dir5 | directory | dir4 | NULL | ed653e21-df50-4101-8add-e5b0132f492d | 42051462-ce5a-4bfc-a182-bb3f6ad85d81 |
| file1 | file | dir5 | local2 | 9308d9c6-2bcc-405e-9ee8-d04986d6e811 | bb87313a-684-4697-addc-cd45d47bee1 |
| file1 | file | dir5 | local1 | 12235180-4590-4805-9fee-12e1e8c5023a | ed653e21-df50-4101-8add-e5b0132f492d |

| Storage | Total_Capacity (GB) | Storage Space (Weightage 55) | | | |
|---|---|---|---|---|---|
| | | Writable_Capacity(GB) (considering 10% read cache) | Free Space (GB) | Free Space % | Ranking |
| Storage 1 (Local Storage) | 1200 | 1080 | 520 | 48 | 3 |
| Storage 2 (SAN Storage) | 1000 | 900 | 468 | 52 | 4 |
| Storage 3 (iSCSI Storage) | 1500 | 1350 | 608 | 45 | 1 |
| Storage N (NAS Storage) | 1000 | 900 | 423 | 47 | 2 |

FIG. 12

| Information | Storage Latency (weightage 45) | |
|---|---|---|
| Storage | Latency (ms) | Ranking |
| Storage 1 (Local Storage) | 2 | 4 |
| Storage 2 (SAN Storage) | 5 | 2 |
| Storage 3 (iSCSI Storage) | 4 | 3 |
| Storage N (NAS Storage) | 10 | 1 |

FIG. 13

| Information | Writable Storage Ranking | |
|---|---|---|
| Formula = Storage Space Ranking x Weightage + Ranking based on Latency x Weightage | | |
| Local_Storage | Overall_Value | Ranking |
| Storage 1 (Local Storage) | (3x55+4x45)= 345 | 4 |
| Storage 2 (SAN Storage) | (4x55+2x45)= 310 | 3 |
| Storage 3 (iSCSI Storage) | (1x55+3x45)= 190 | 2 |
| Storage N (NAS Storage) | (2x55+1x45)= 155 | 1 |

FIG. 14

CLOUD-SCALE FILE-BASED FILESYSTEM FOR HYBRID CLOUD STORAGE

RELATED APPLICATIONS

Benefit is claimed under 35 U.S.C. 119(a)-(d) to Foreign Application Serial No. 201741023170 filed in India entitled "CLOUD-SCALE FILE-BASED FILESYSTEM FOR HYBRID CLOUD STORAGE", on Jun. 30, 2017, by VMware, Inc., which is herein incorporated in its entirety by reference for all purposes

BACKGROUND

Currently, no block or file level storage can aggregate heterogeneous storages and expose them as a single continuously writable storage space. This problem may be addressed using file level storages. However, file level storages fail to create a unified pool of storages by combining Network File System (NFS), Small Computer Systems Interface (SCSI), Internet Small Computer Systems Interface (iSCSI), object-based, and public cloud storages and abstracting them as a single access point that is the sum of all the underlying storages.

In a filesystem supported by multiple storages, a decision is made on which storage to execute a write operation. A block based file system traditionally selects a storage using a round robin process or as defined by RAID levels. This does not create any problem with distribution and balance because the storages are typically from a single storage box or from different storage boxes situated very near to each other so they give similar performance. In addition, data is eventually evenly distributed (as the block sizes are same) in block storage. Other systems mostly based the decision on capacity only.

In a file-based filesystem supporting cloud storage and diverse on-premises storage, the above solutions do not offer the best performance. Latency is widely varied in these cases. For example, if the filesystem is aggregating multiple cloud providers, the latencies of the cloud storages may vary from the each other and over time. Similarly, for on-premises storages, latency of a network area storage (NAS) storage may be much higher than a storage area network (SAN) storage.

BRIEF DESCRIPTION OF THE DRAWINGS

FIG. 3 shows database records for directories and files in a Network File System (NFS) share in examples of the present disclosure.

FIGS. 6-1, 6-2, and 6-3 (collectively "FIG. 6") form a block diagram of a method to create a file in the NFS share in examples of the present disclosure.

FIGS. 7-1 and 7-2 (collectively "FIG. 7") form a block diagram of a method to write a file in the NFS share in examples of the present disclosure.

FIGS. 8-1 and 8-2 (collectively "FIG. 8") form a block diagram of a method to read a file from the NFS share in examples of the present disclosure.

FIG. 9 shows database records for directories and files in a NFS share in examples of the present disclosure.

FIGS. 11-1 and 11-2 (collectively "FIG. 11") form a block diagram of a method for a storage selection engine of FIG. 2 to select the best performing storage for a write file command to a NFS share in examples of the present disclosure.

FIG. 12 shows a table in a ranking file of FIG. 2 that records the storage capacities in examples of the present disclosure.

FIG. 13 shows a table in the ranking file of FIG. 2 that records the storage latencies in examples of the present disclosure.

FIG. 14 shows a table in the ranking file of FIG. 2 that records the final rankings of storages in examples of the present disclosure.

DETAILED DESCRIPTION

Figure 1:
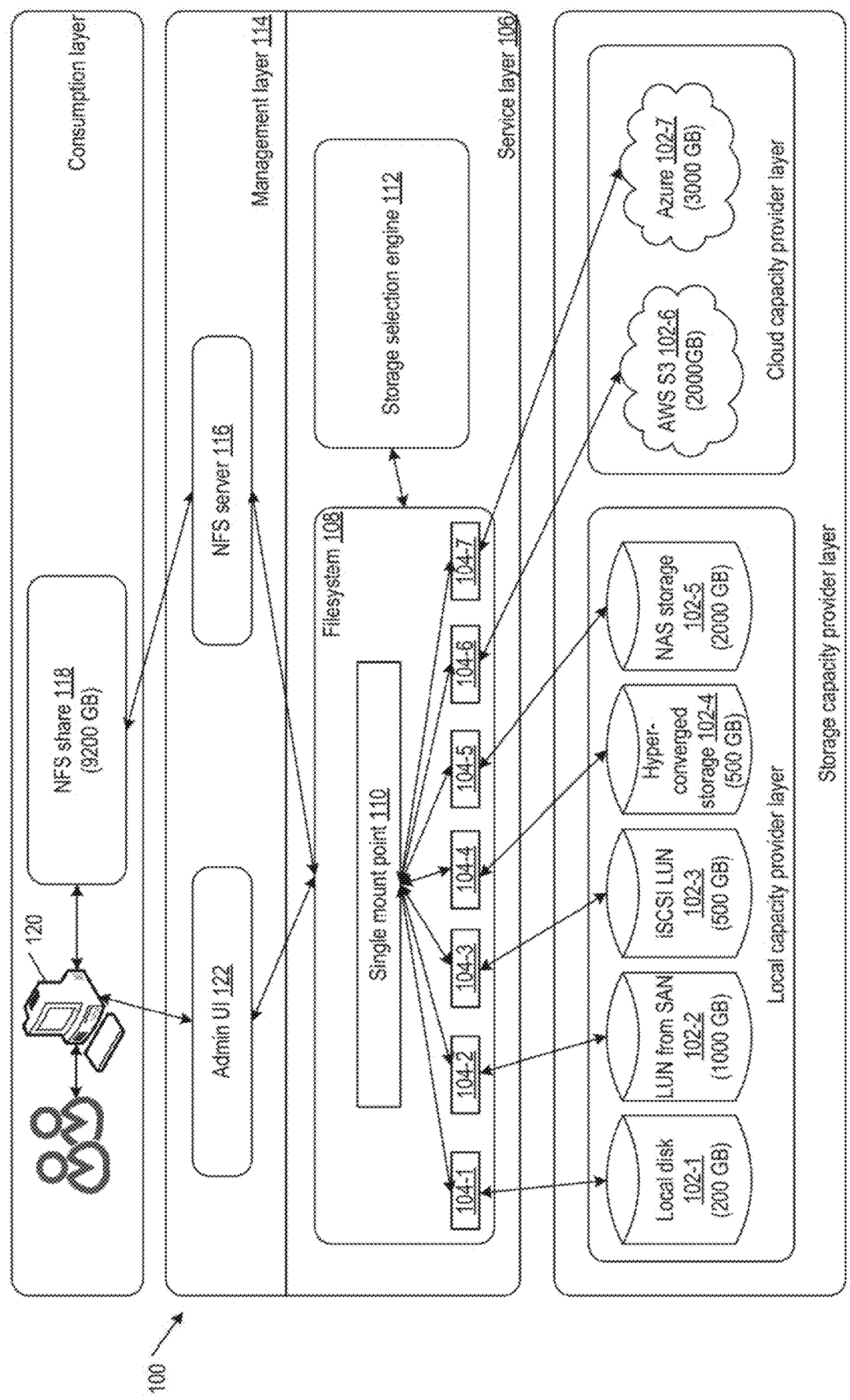
FIG. 1 is a block diagram illustrating a system including a server and heterogeneous storages in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

In examples of the invention, heterogeneous (on-premises, cloud, and hyper-converged) storage devices are mounted to the root (native) filesystem of a server. A cloud-scale file-based filesystem abstracts all the mounts to a single mount point and exports this single mount point as a share, such as a NFS share. Although NFS is specifically mentioned, other file sharing protocol such as the Common Internet File System (CIFS) may be used. The capacity of the share is the sum of the capacities of all the underlying mounts.

The cloud-scale file-based filesystem abstracts its directory structure by maintaining a database that stores filesystem metadata. The cloud-scale file-based filesystem does not create directories in the underlying native filesystems of the server. In the cloud-scale file-based filesystem, directories are virtual entities that exist only in the database. The underlying native filesystem is not aware of the directories that exist in the cloud-scale file-based filesystem. The cloud-scale file-based filesystem maintains its entire directory structure in the database.

The cloud-scale file-based filesystem writes files in the underlying storage locations or mounts in a flat structure. This means none of the physical storage mounts has multiple levels or directories inside it, which may be problematic when there is file or directory name duplication at different levels. To address this, the cloud-scale file-based filesystem generates a universally unique identifier (UUID) for every directory and file. The cloud-scale file-based filesystem writes the files to the underlying storage devices with their UUIDs instead of their original filenames. The cloud-scale file-based filesystem maintains the UUIDs and the original filenames in the database. The cloud-scale file-based filesystem does not expose the UUIDs to the end user. The cloud-scale file-based filesystem handles the file name to UUID conversion and vice versa. When a program or user performs a file read operation, the cloud-scale file-based filesystem converts the filename to the corresponding UUID, fetches the file from the actual storage location, and presents it to the program or user with the filename originally requested.

When a program or user performs a file write operation, the cloud-scale file-based filesystem dynamically chooses the best storage device for the write based on capacity and latency of the available storage devices.

As described above, a single unified cohesive solution (U) is provided with the following properties:

$U \supseteq M$, $U \supseteq N$, $U \supseteq O$, $U \supseteq P$, $U \supseteq Q$, ... $U \supseteq X$ (U is a universal set consisting subsets M, N, O, P, Q ... X).

M, N, O, P, Q ... X can be further represented as $$M = \sum_{i=1}^{n} A_i$$

$$N = \sum_{i=1}^{n} B_i$$

$$O = \sum_{i=1}^{n} C_i$$

$$P = \sum_{i=1}^{n} D_i$$

$$Q = \sum_{i=1}^{n} E_i$$

...

$$X = \sum_{i=1}^{n} Y_i,$$

where A, B, C, D, E ... Y are different types of storage devices (iSCSI, SCSI, NFS, object storage, cloud storage).

$A_i$ = storage from NFS storage type
$B_i$ = storage from iSCSI storage type
$C_i$ = storage from SCSI storage type
$D_i$ = storage from object storage type
$E_i$ = storage from cloud storage type
...
$Y_i$ = storage from any other type U can be further defined as U=M+N+O+P+Q ... +X.

Each instance of M, N, O, P, Q ... X are part of solution U and value of U is summation of all of them.

FIG. 1 is a block diagram illustrating a system including a server 100 and heterogeneous storage devices 102-1, 102-2 ... 102-7 (collectively as "storages 102" or as a generic individual "storage 102") in examples of the present disclosure. Server 100 may be a virtual or a physical appliance. Storages 102-1, 102-2 ... 102-7 are respectively mounted at mount points 104-1, 104-2 ... 104-7 (collectively as "mount points 104" or as a generic individual "mount point 104") in the native filesystem of server 100. The native filesystem may be part or separate from the operating system (OS) of server 100. Storages 102 may include on-premises, cloud, and hyper-converged storages accessed through protocols such as SCSI, iSCSI, NFS, Fibre Channel (FC), and Fibre Channel over Ethernet (FCoE). On-premises storages may include local disks, SANs, and NASs. Cloud storages may include Amazon Simple Storage Service (S3) and Microsoft Azure. The types and sizes of storages 102 listed in FIG. 1 are for illustrative purposes only.

Server 100 includes a service layer 106 having a cloud-scale file-based filesystem 108. Filesystem 108 aggregates and abstracts mount points 104 of storages 102 as a single mount point 110. Mount point 110 is a directory in the native filesystem of server 100. Filesystem 108 exports directory 110 to other machines. Filesystem 108 handles all the typical operations to directory 110, such as write, read, delete/remove files and directories.

Service layer 106 also has a storage selection engine 112 that determines the best performing storage 102 for each write operation based on storage usage and latency.

Server 100 includes a management layer 114 having a native NFS server 116, which may be part of the OS. NFS server 116 exports directory 110 as a NFS share 118 to client machines 120.

Management layer 114 also has an administrator user interface (admin UI) 122. Admin UI 122 provides the interactive user interface to configure and manage server 100. Through admin UI 122, a user may select storages 102 to be aggregated and abstracted, create directory 110, and instructs NFS server 116 to export directory 110 as NFS share 118.

Filesystem 108 may be implemented with user space code using Filesystem in USEerspace (FUSE) in some examples of the present disclosure. FUSE is a kernel module for Unix-like computer OSs that allows users to create filesystems without editing kernel code. Filesystem code runs in user space while the FUSE kernel module in the kernel space provides a bridge to the actual kernel interfaces. Alternatively, filesystem 108 may be implemented with kernel space code.

Figure 2:
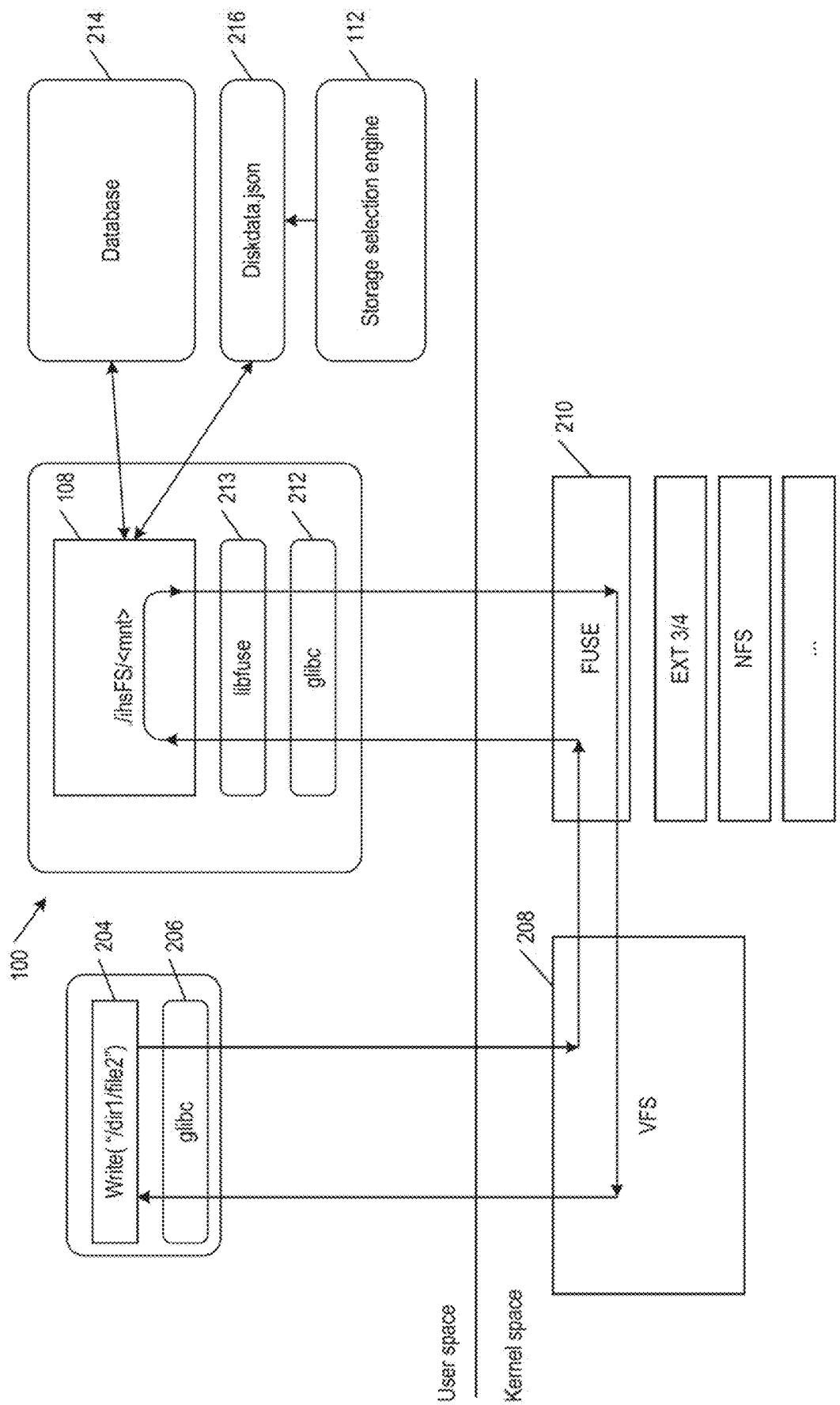
FIG. 2 is a block diagram illustrating the server of FIG. 1 with a user space filesystem in examples of the present disclosure.

FIG. 2 is a block diagram illustrating server 100 having a cloud-scale file-based filesystem 108 implemented with user space code using FUSE in examples of the present disclosure. When filesystem 108 starts, it exports directory 110 (FIG. 1) as a NFS share 118 (FIG. 1) having the combined capacities of storages 102 (FIG. 1). A program or a user in the user space issues a command 204 against NFS share 118, which goes through a standard C library 206 (e.g., glibc) to a virtual file system (VFS) 208 in the kernel space. Commands 204 may be common filesystem operations, such as write, read, and delete/remove a file or a directory. VFS 208 forwards the command to FUSE kernel module 210 since NFS share 118 corresponds to a FUSE based filesystem. FUSE kernel module 210 sends the command through a standard C library 212 (e.g., glibc) and a FUSE library (libfuse) 213 to filesystem 108 in the user space. Filesystem 108 returns the result back down the stack to FUSE kernel model 210, through VFS 208, and back to the requester.

When a program or a user issues a command 204 to create a directory, filesystem 108 does not create a physical directory under the native filesystem of server 100. Instead, filesystem 108 creates a record in a database 214 for each directory to store directory related information. To distinguish between directories with the same name, filesystem 108 generates a UUID for every directory.

When a program or a user issues a command 204 to write a file, filesystem 108 uses storage selection engine 112 to select the best performing storage 102 for the write based on storage usage and latency. Filesystem 108 writes the file to the selected storage 102 in a flat structure, i.e., in the root directory of the selected storage 102. To distinguish between files with the same, name, filesystem 108 generates a UUID for every file. The UUID has a sufficient number of bits (e.g., 128 bits) to ensure directories and files in server 100 have unique identifiers. Filesystem 108 writes the file to the selected storage 102 with its UUID instead of its actual file names, and creates a record in database 214 for the file to store file related information.

Fields in the record for an element (directory or file) include:
1) name=name of the element;
2) type=element type (directory or file);
3) parent=parent directory name;
4) location=actual storage location; NULL in case the element is a directory;
5) uuid=UUID of the element;
6) p_uuid=UUID of the parent element;
7) st_mode=access mode of the element;
8) st_ctime=creation time of the element;
9) st_mtime=modification time of the element; and
10) st_atime=access time of the element.

The uuid field of any element cannot be NULL but the p_uuid field of an element may be NULL. If the p_uuid field of an element is NULL, then the element resides directly in the root directory. The uuid field of any element is unique. Database 214 (FIG. 2) checks the uuid fields to ensure, all values are unique (e.g., imposing a UNIQUE constraint). The p_uuid field of an element may not be unique when multiple elements are in the same parent element (directory). The creation time of any directory or file (st_ctime) cannot be NULL but modification (st_mtime) or access time (st_atime) may be NULL.

Figure 4:
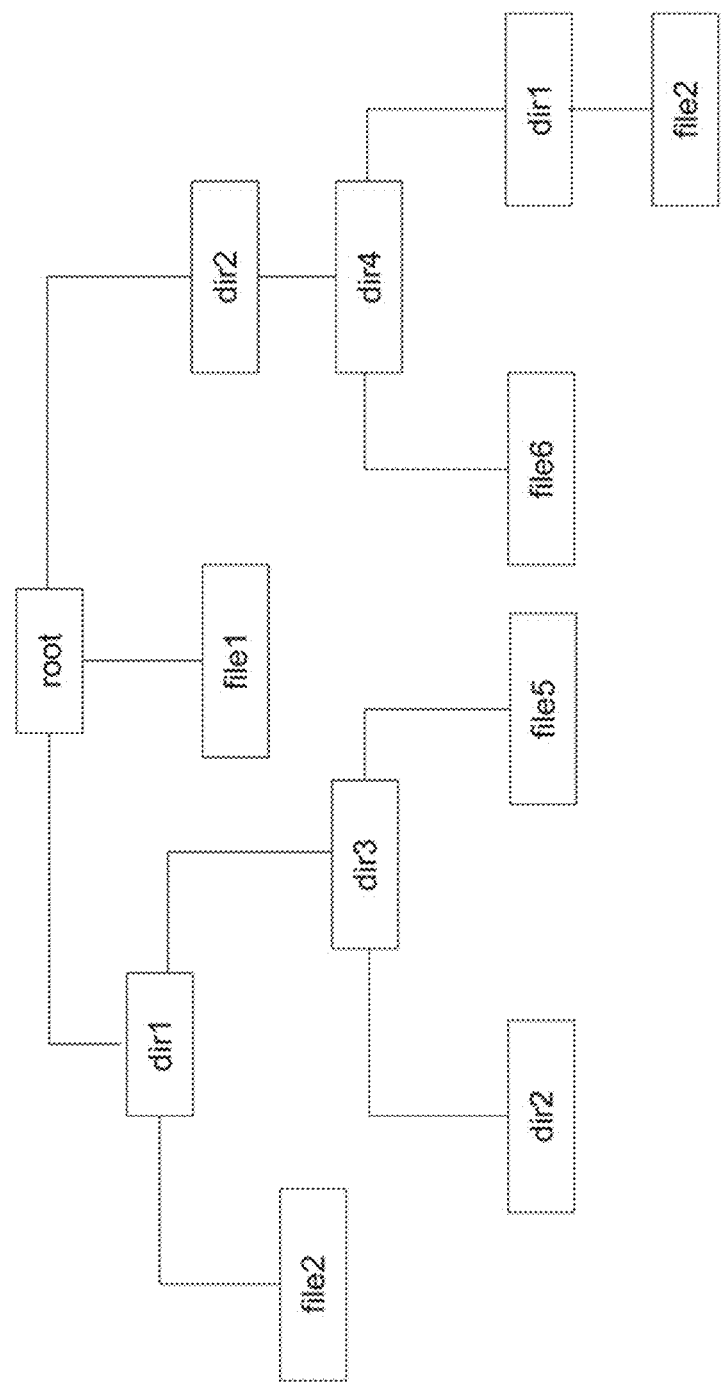
FIG. 4 shows a directory structure corresponding to the records of FIG. 3 in examples of the present disclosure.
Figure 5:
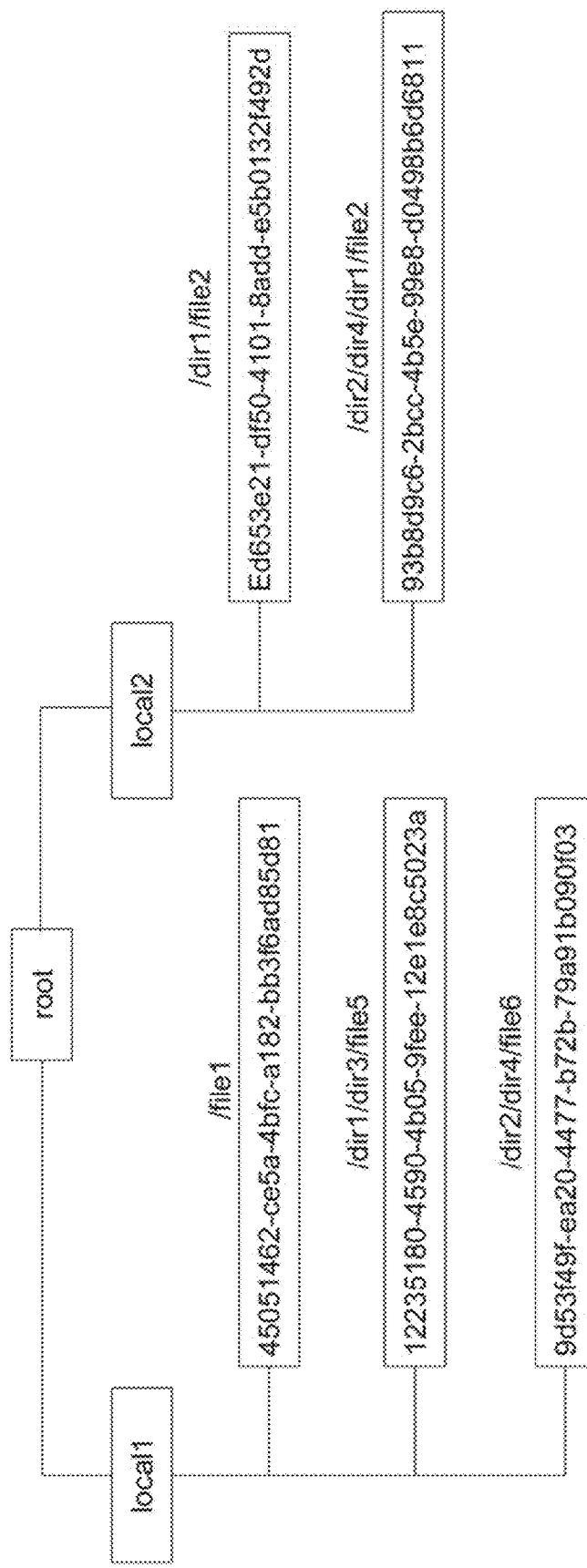
FIG. 5 shows actual file names in storage locations of the files in the NFS share of FIG. 3 in examples of the present disclosure.
Figures 1, 6:
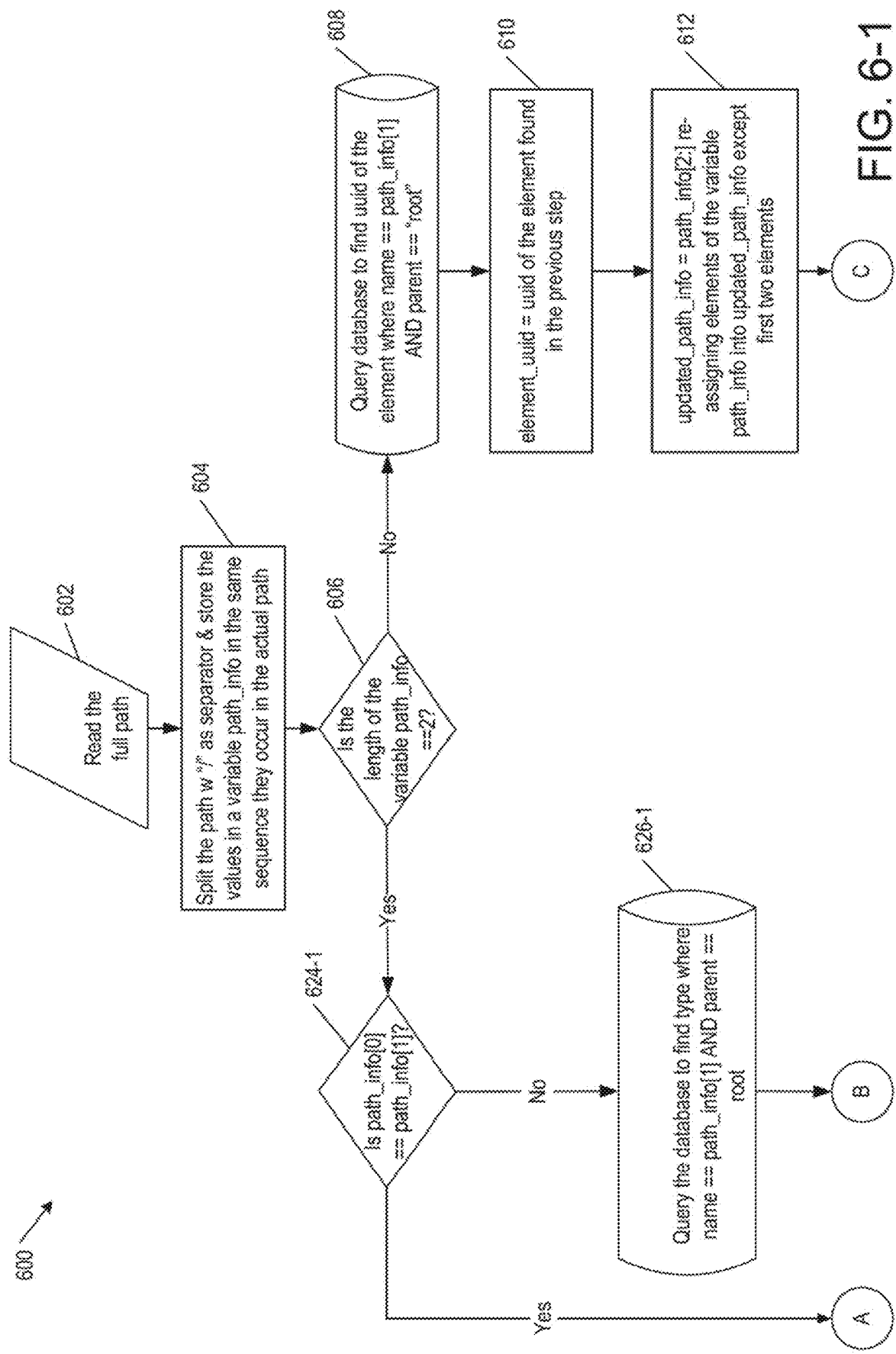
Figures 2, 6:
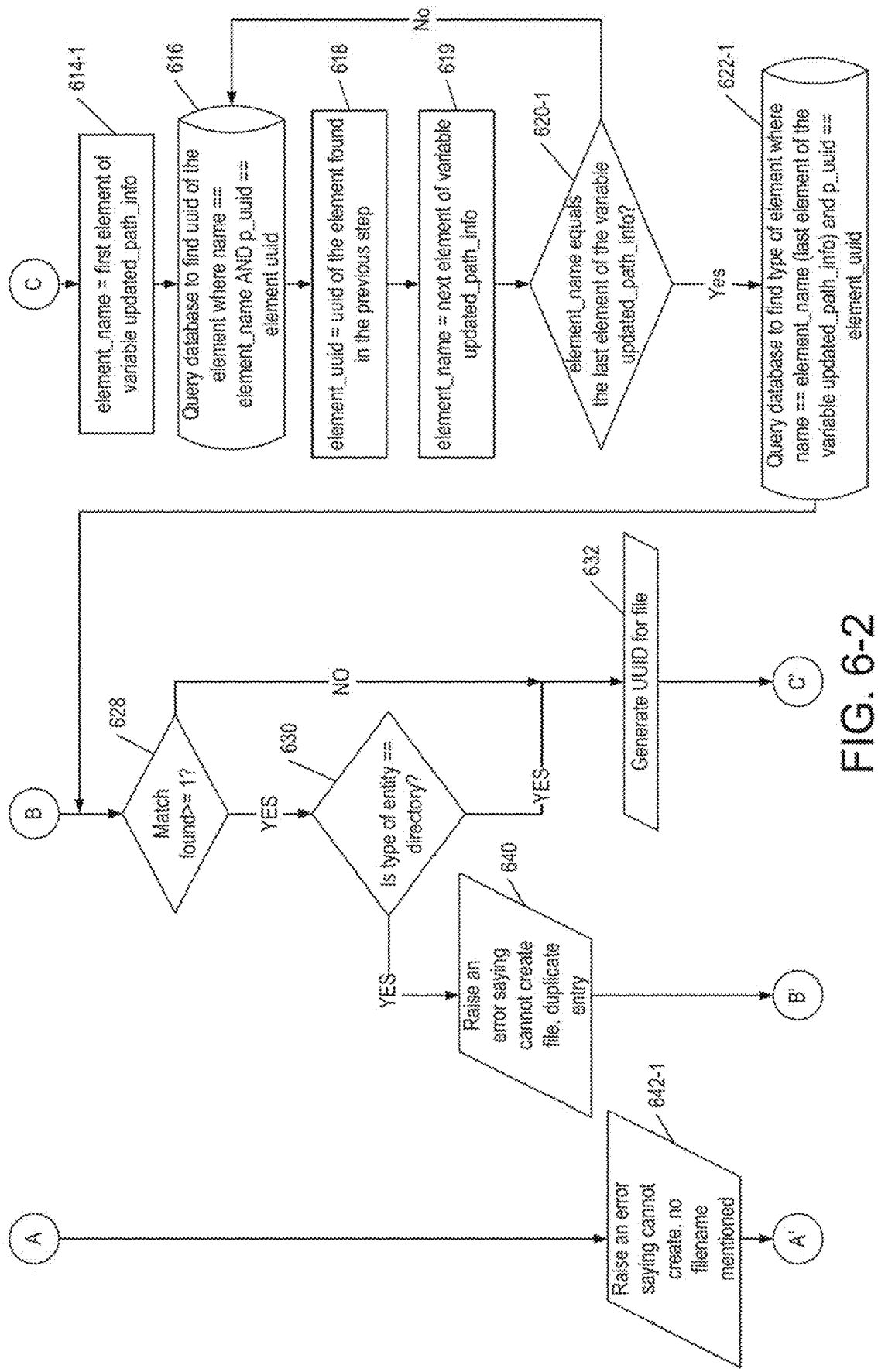
Figures 3, 6:
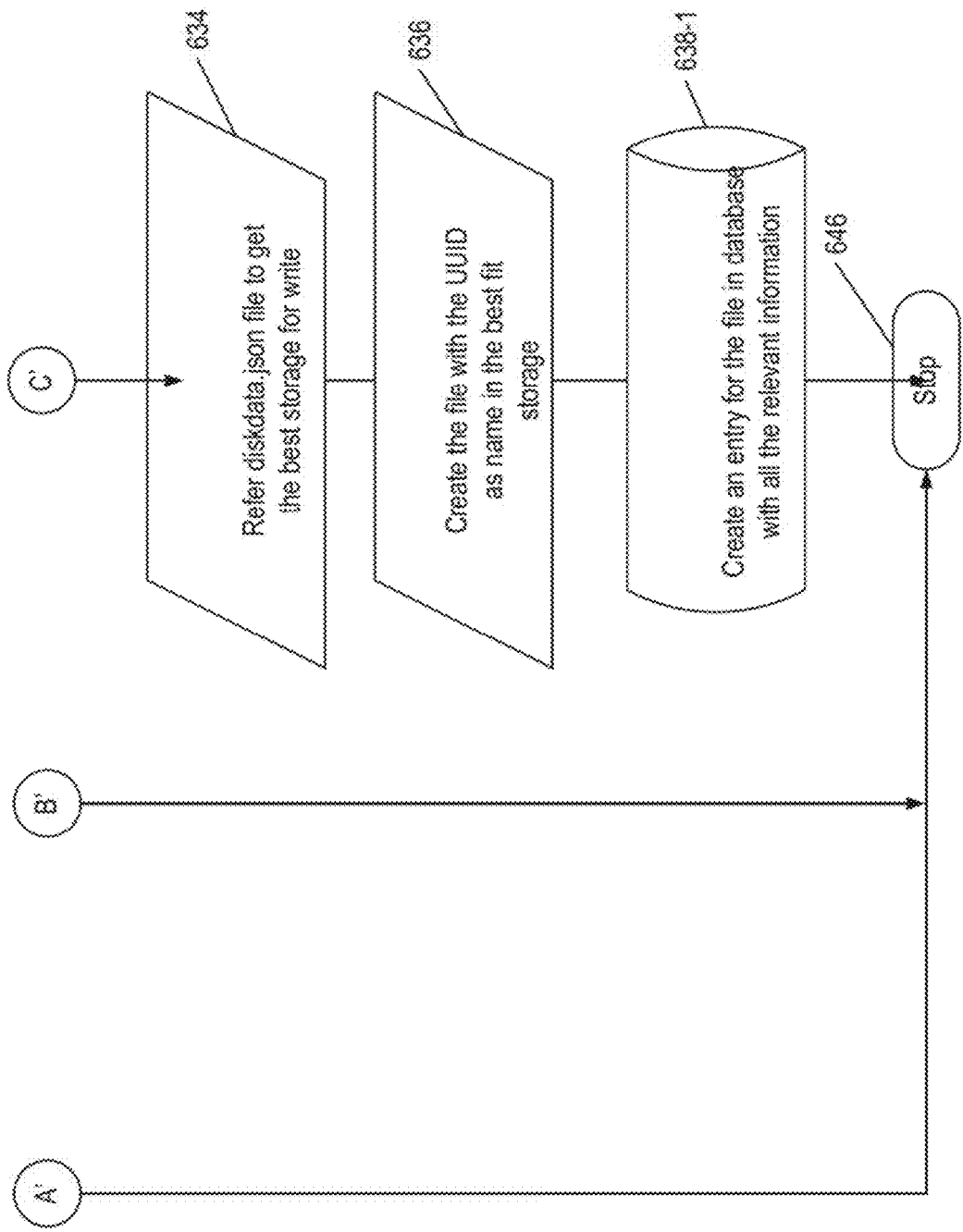

FIGS. 3, 4, and 5 illustrate how filesystem 108 (FIG. 2) handles directories and files with duplicate names in examples of the present disclosure. FIG. 3 shows database records of a directory 110 (FIG. 1) exported as a NFS share 118 (FIG. 1). Each record includes the relationship between an element and its parent, which filesystem 108 uses to capture and later recreate a directory structure of directories and files in NFS share 118. FIG. 4 shows the directory structure corresponding to the records in FIG. 3. FIG. 5 shows the actual file names in the storage locations of the files in NFS share 118.

FIGS. 3, 4, and 5 illustrate the following points about the directory structure. First, there are two instances where the directory names are same. Two separate directories with the same name "dir1" exist, one in the root directory (/) and another in directory dir4 (/dir2/dir4). Similarly, two separate directories with the same name "dir2" exist, one in the root directory (/) and another in directory dir3 (/dir1/dir3). Second, two separate files with the same name "file2" exist, one in directory dir3 (/dir1/dir3/file2) and another in directory dir1 (/dir2/dir4/dir1/file2). Third, both the files with the name "file2" exist in the same storage location /local2.

The first point shows that directories with the same name may exist. To distinguish directories with the same name, filesystem 108 generates a UUID for each directory and assign the UUID to the directory in its record in database 214. Filesystem 108 then writes the file to its storage location with its UUID as its file name.

Referring to FIG. 3, the directory dir1 in the root directory (/) and the directory dir1 in directory dir4 (/dir2/dir4) have the same name but different UUIDs in their records. Similarly, directory dir2 in the root directory (/) and directory dir1 in directory dir3 (/dir1/dir3) have the same name but different UUIDs in their records.

The second and third points show that files with the same name may be written to the same storage location even though files are written to storages 102 in a flat structure and the storage location engine 112 (FIG. 2) selects the best performing storage 102 without considering the names of the files already in storages 102. To distinguish between the files with the same name, filesystem 108 generates a UUID for each file and assign the UUID to the file in its record in database 214. Filesystem 108 then writes the file to a storage location with its UUID as its file name and retains the file's original file name in its record.

Referring to FIGS. 3 and 5, the two files with the same name "file2" are saved in the root directory of storage /local2 with different UUIDs. As filesystem 108 randomly generates the UUIDs and database 214 protects the uuid fields for uniqueness, files cannot have the same name in the same storage location.

FIG. 6 is a block diagram of a method 600 to create a file in NFS share 118 in examples of the present disclosure. Method 600, and any method described herein, may be implemented as instructions encoded on a computer-readable medium that is to be executed by a processors in a computer system. Method 600, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 600 may begin in block 602.

In block 602, filesystem 108 reads the path in a file command (e.g., create file command) for NSF share 118. Block 602 may be followed by block 604.

In block 604, filesystem 108 parses elements (directory or file), or more precisely their names, from the path. For example, filesystem 108 splits the path with the forward slash (/) as the delimiter between element names and stores them as values in a variable path_info in the same sequence the element names occur in the path. Block 604 may be followed by block 606.

In block 606, filesystem 108 determines if the last element is located in the root directory of NFS share 118. The last element is located in the root directory of NFS share 118 if the variable path_info has only two (2) values: a first value representing the root directory and a second value representing the element. For example, filesystem 108 determines if the length of the variable path_info is two (2). If no, block 606 may be followed by block 608. If yes, block 606 may be followed by block 624-1.

In blocks 608 to 620-1, filesystem 108 recursively matches every pair of consecutive elements in the path to a record in database 214. For each pair of consecutive element, filesystem 108 compares the first element's UUID and the second element's name against the p_uuid and the name fields of the records in database 214 to find a matching record and determine the UUID of the second element from the matching record. This process takes advantage of the fact that the UUID of the first element in the very first pair of consecutive elements must be NULL because the first element is the root (/) of the native filesystem. The process then repeats until the second-to-last pair of consecutive elements in the path is processed.

In block 608, filesystem 108 queries database 214 for a record of an element having (1) the first element in the path (the root directory) as its parent element and (2) the same name as the second element in the path. Specifically, filesystem 108 queries database 214 for a record of an element having (1) a parent name equal to root (or a p_uuid equal to NULL) and (2) a name equal to the second value in the variable path_info (path_info[1]). Filesystem 108 then retrieves the element's uuid from the record. Block 608 may be followed by block 610.

In block 610, filesystem 108 saves the current element's uuid found in block 608 in order to match the current element as the parent element of the next element in the path. For example, filesystem 108 sets a variable element_uuid equal to the current element's uuid. Block 610 may be followed by block 612.

In block 612, filesystem 108 removes the first two elements in the path. For example, filesystem 108 assigns all but the first two values in the variable path_info into a variable updated_path_info. Block 612 may be followed by block 614.

In block 614-1, filesystem 108 selects the first element in the path as the current element in an iteration including blocks 616, 618, and 620. For example, filesystem 108 sets a variable element_name equal to the first value in the variable updated_path_info. Block 614-1 may be followed by block 616.

In block 616, filesystem 108 queries database 214 for a record of an element having (1) the prior element in the path as its parent element and (2) the same name as the current element. Specifically, filesystem 108 queries database 214 for a record of an element having (1) a p_uuid equal to the variable element_uuid and (2) a name equal to the variable element_name. Filesystem 108 then retrieves the current elements uuid from the record. Block 616 may be followed by block 618.

In block 618, filesystem 108 saves the current element's uuid found in block 616 in order to match the current element as the parent element of the next element in the path. For example, filesystem 108 sets the variable element_uuid equal to the current element's uuid. Block 618 may be followed by block 619.

In block 619, filesystem 108 selects the next element in the path. For example, filesystem 108 sets variable element_name equal to the next value in the variable updated_path_info. Block 619 may be followed by block 620.

In block 620-1, filesystem 108 determines if it has determined the uuid of the second-to-last element in the path. For example, filesystem 108 determines if the variable element_name equal the last element of the variable updated_path_info. If so, block 620-1 may be followed by block 622-1. Otherwise, block 620 loops back to block 616 to continue the iteration.

In block 622-1, filesystem 108 queries database 214 for a record of an element having (1) the prior element in the path as its parent element and (2) the same name as the last element. Specifically, filesystem 108 queries database 214 for a record of an element having (1) a p_uuid equal to the variable element_uuid and (2) a name equal to the variable element_name. If such a record is found, filesystem 108 retrieves the elements type from the record. Block 622-1 may be followed by block 628.

In block 624-1, filesystem 108 determines if the create file command attempts to create a file without a filename. For example, filesystem 108 determines if the variable path_info has two blank values, i.e., path_info[0] and path_info[1] are equal. If so, block 624-1 may be followed by block 642-1 to raise an error as the requester is attempting to create a file without a filename. Otherwise, block 624-1 may be followed by block 626-1.

In block 626-1, filesystem 108 determines the type of the second element in the path. For example, filesystem 108 queries database 214 for a record of an element having (1) the first element in the path (the root directory) as its parent element and (2) the same name as the second element in the path. Specifically, filesystem 108 queries database 214 for a record of an element having (1) a parent name equal to root (or a p_uuid equal to NULL) and (2) a name equal to the second value in the variable path_info (path_info[1]). Filesystem 108 then retrieves the second elements type from the record. Block 626-1 may be followed by block 628.

In block 628, filesystem 108 determines if a matching record has been found from the query in block 626-1. If so, block 628 may be followed by block 630. Otherwise, block 628 may be followed by block 632.

In block 630, filesystem 108 determines if the type is equal to directory. If so, block 630 may be followed by block 640 to raise an error as the requester is attempting to create a duplicate file. Otherwise, block 630 may be followed by block 632.

In block 630, filesystem 108 returns an error to the requester indicting a read file command cannot read a directory. Block 630 may be followed by block 632.

In block 632, filesystem 108 generates a UUID for the file. Block 632 may be followed by block 634.

In block 634, filesystem 108 reads data file 216 to select the best performing storage 102 for writing the file. Block 634 may be followed by block 636.

In block 636, filesystem 108 creates the file with the UUID generated in block 632 as its filename in the selected storage 102. Block 636 may be followed by block 638-1.

In block 638-1, filesystem 108 creates an entry for the file in database 214 with all the relevant information. Block 638-1 may be followed by block 646, which ends method 600.

In block 640, filesystem 108 raises an error saying it cannot create a duplicate file. Block 640 may be followed by block 646, which ends method 600.

In block 642-1, filesystem 108 raises an error saying it cannot create a file without a filename. Block 642-1 may be followed by block 646, which ends method 600.

Figures 2, 7:
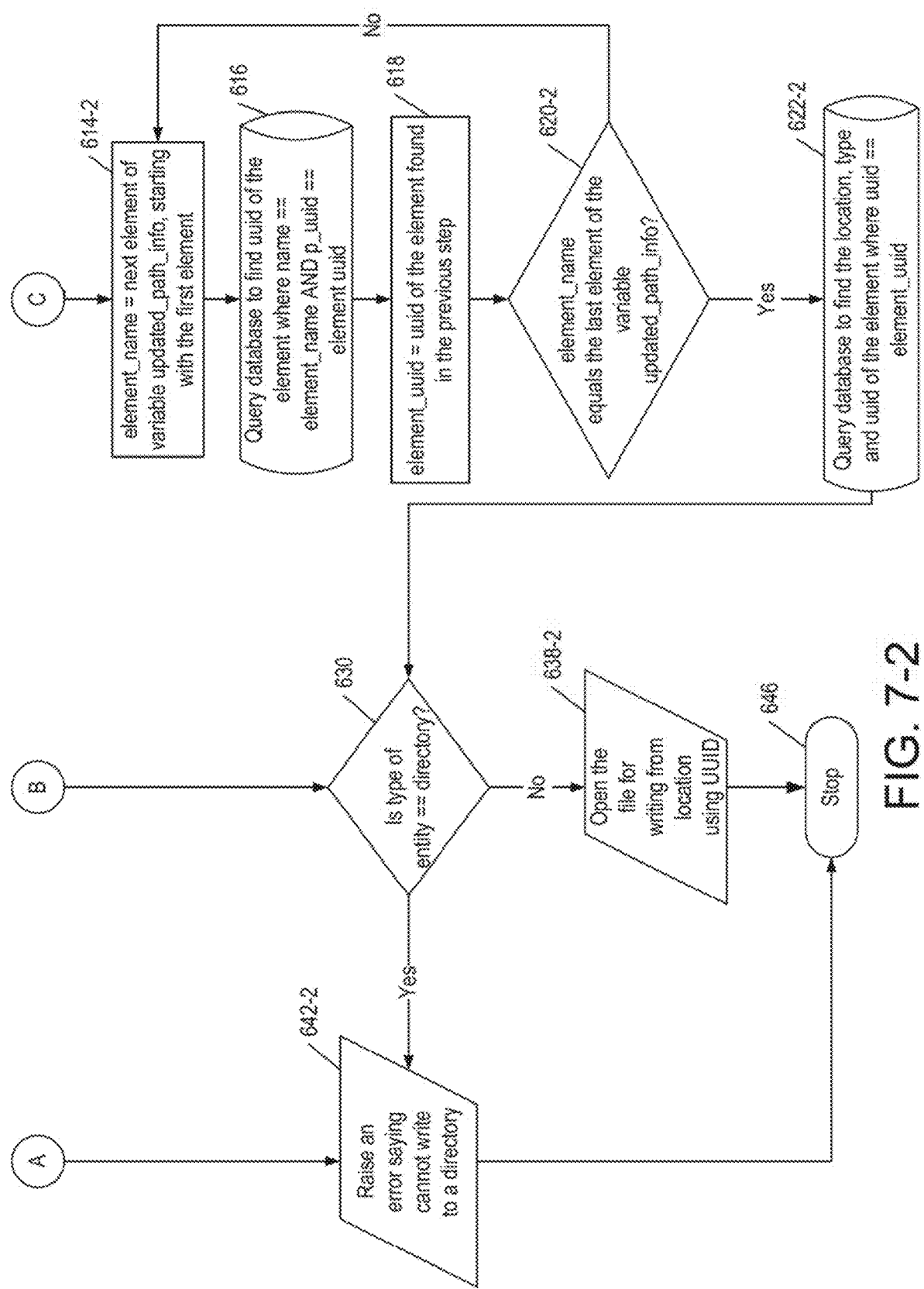

FIG. 7 is a block diagram of a method 700 to write a file in NFS share 118 in examples of the present disclosure. The details of certain blocks in method 700 are not repeated as they have been explained with respect to method 600 (FIG. 6). Method 700 may begin in block 602.

In block 602, filesystem 108 reads the path in a file command (e.g., write file command) for NSF share 118. Block 602 may be followed by block 604.

In block 604, filesystem 108 parses elements (directory or file), or more precisely their names, from the path. Block 604 may be followed by block 606.

In block 606, filesystem 108 determines if the last element is located in the root directory of NFS share 118. If no, block 606 may be followed by block 608. If yes, block 606 may be followed by block 624-2.

In blocks 608 to 620-2, filesystem 108 recursively matches every pair of consecutive elements in the path to a record in database 214. The process then repeats until the last pair of consecutive elements in the path is processed.

In block 608, filesystem 108 queries database 214 for a record of an element having (1) the first element in the path (the root directory) as its parent element and (2) the same name as the second element in the path. Filesystem 108 then retrieves the element's uuid from the record. Block 608 may be followed by block 610.

In block 610, filesystem 108 saves the current element's uuid found in block 608 in order to match the current element as the parent element of the next element in the path. Block 610 may be followed by block 612.

In block 612, filesystem 108 removes the first two elements in the path. Block 612 may be followed by block 614-2.

In block 614-2, filesystem 108 selects the next element in the path as the current element in an iteration including blocks 614, 616, 618, and 620. For example, filesystem 108 sets a variable element name equal to the next value in the variable updated_path_info, starting with the first element. Block 614-2 may be followed by block 616.

In block 616, filesystem 108 queries database 214 for a record of an element having (1) the prior element in the path as its parent element and (2) the same name as the current element. Filesystem 108 then retrieves the current element's uuid from the record. Block 616 may be followed by block 618.

In block 618, filesystem 108 saves the current elements uuid found in block 616 in order to match the current element as the parent element of the next element in the path. Block 618 may be followed by block 620-2.

In block 620-2, filesystem 108 determines if it has determined the uuid of the last element in the path. For example, filesystem 108 determines if the variable element_name equal the last element of the variable updated_path_info. If so, block 620-2 may be followed by block 622-2. Otherwise, block 620 loops back to block 614-2 to continue the iteration.

In block 622-2, filesystem 108 retrieves the type and the storage location from the record found in block 616. Block 622-2 may be followed by block 630.

In block 624-2, filesystem 108 determines if the write file command attempts to write a directory instead of a file. For example, filesystem 108 determines if the variable path_info has two blank values, i.e., path_info[0] and path_info[1] are equal. If so, block 624-2 may be followed by block 642-2 to raise an error as the requester is attempting to write a directory with write file command. Otherwise, block 624-2 ay be followed by block 626-2.

In block 626-2, filesystem 108 determines the storage location, the type, and the uuid of the second element in the path. For example, filesystem 108 queries database 214 for a record of an element having (1) the first element in the path (the root directory) as its parent element and (2) the same name as the second element in the path. Specifically, filesystem 108 queries database 214 for a record of an element having (1) a parent name equal to root (or a p_uuid equal to NULL) and (2) a name equal to the second value in the variable path_info (path_info[1]). Filesystem 108 then retrieves the second element's storage location, type, and uuid and from the record. Block 626-2 may be followed by block 630.

In block 630, filesystem 108 determines if the second element's type equal to directory. If so, block 630 may be followed by block 642-2 to raise an error as the requester is attempting to write a directory instead of a file. Otherwise, block 630 may be followed by block 638-2.

In block 638-2, filesystem 108 opens the file for writing from the storage location using the second elements uuid as the filename. Block 638-2 may be followed by block 646, which ends method 600.

In block 642-2, filesystem 108 raises an error saying it cannot write to a directory. Block 642-2 may be followed by block 646, which ends method 600.

Figures 1, 8:
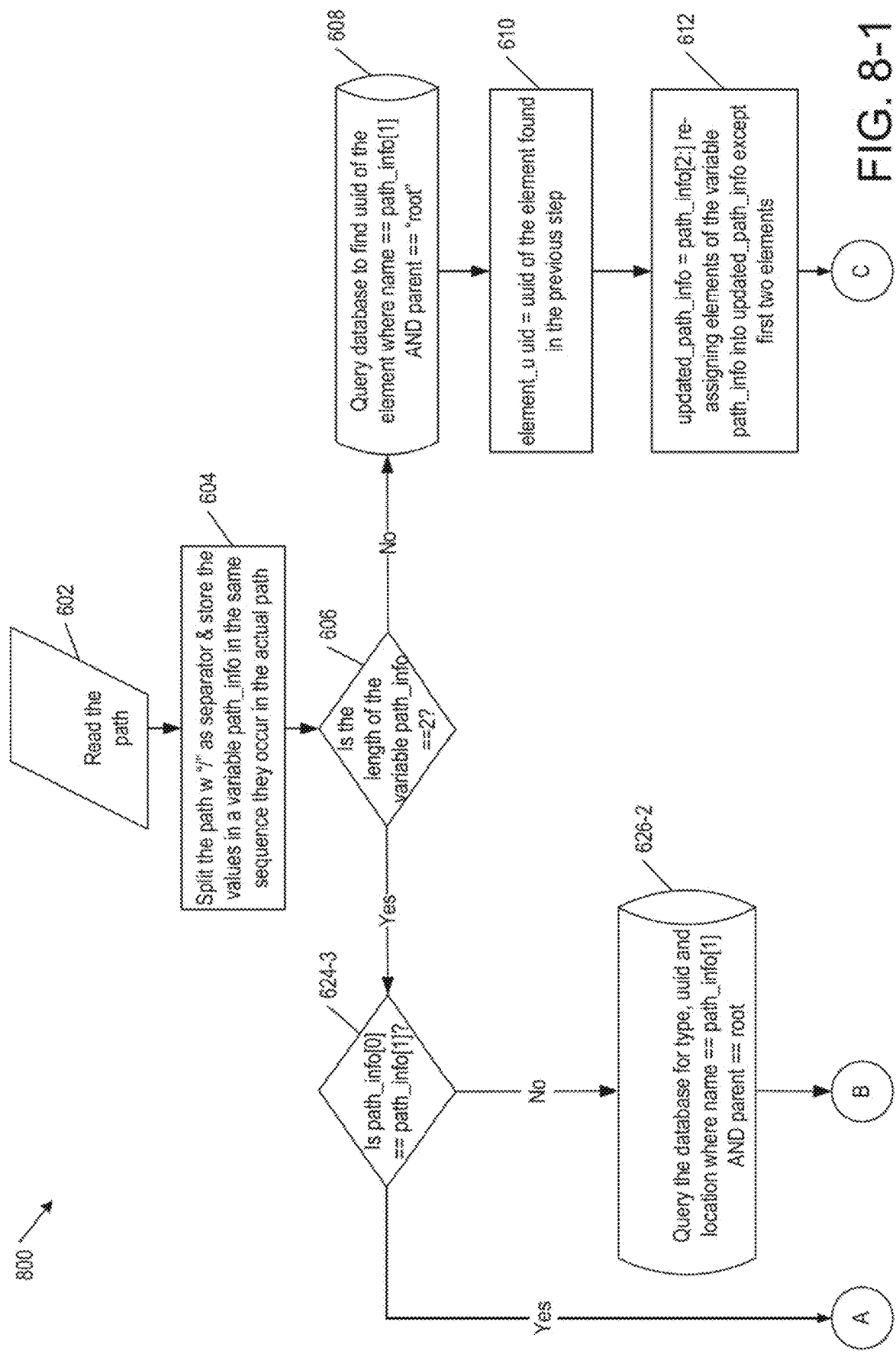
Figures 2, 8:
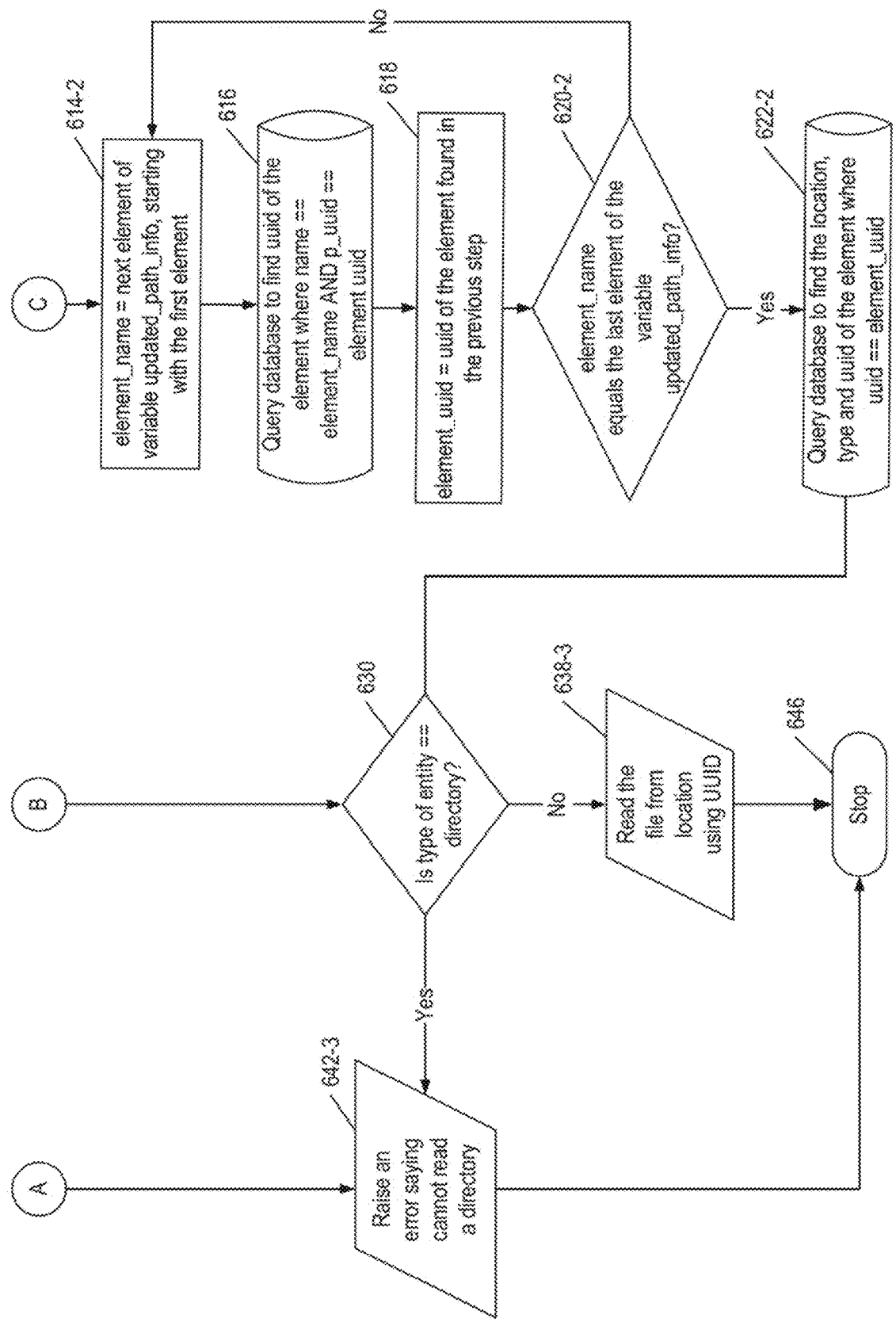

FIG. 8 is a block diagram of a method 800 to read a file from NFS share 118 in examples of the present disclosure. The details of certain blocks in method 800 are not repeated as they have been explained with respect to method 600 (FIG. 6) and method 700 (FIG. 7). Method 800 may begin in block 602.

In block 602, filesystem 108 reads the path in a file command (e.g., read file command) for NSF share 118. Block 602 may be followed by block 604.

In block 604, filesystem 108 parses elements (directory or file), or more precisely their names, from the path. Block 604 may be followed by block 606.

In block 606, filesystem 108 determines if the last element is located in the root directory of NFS share 118. If no, block 606 may be followed by block 608. If yes, block 606 may be followed by block 624-2.

In blocks 608 to 620-2, filesystem 108 recursively matches every pair of consecutive elements in the path to a record in database 214. The process then repeats until the last pair of consecutive elements in the path is processed.

In block 608, filesystem 108 queries database 214 for a record of an element having (1) the first element in the path (the root directory) as its parent element and (2) the same name as the second element in the path. Filesystem 108 then retrieves the element's uuid from the record. Block 608 may be followed by block 610.

In block 610, filesystem 108 saves the current element's uuid found in block 608 in order to match the current element as the parent element of the next element in the path. Block 610 may be followed by block 612.

In block 612, filesystem 108 removes the first two elements in the path. Block 612 may be followed by block 614-2.

In block 614-2, filesystem 108 selects the next element in the path as the current element in an iteration including blocks 614, 616, 618, and 620. Block 614-2 may be followed by block 616.

In block 616, filesystem 108 queries database 214 for a record of an element having (1) the prior element in the path as its parent element and (2) the same name as the current element. Filesystem 108 then retrieves the current element's uuid from the record. Block 616 may be followed by block 618.

In block 618, filesystem 108 saves the current element's uuid found in block 616 in order to match the current element as the parent element of the next element in the path. Block 618 may be followed by block 620-2.

In block 620-2, filesystem 108 determines if it has determined the uuid of the last element in the path. If so, block 620-2 may be followed by block 622-2. Otherwise, block 620 loops back to block 614-2 to continue the iteration.

In block 622-2, filesystem 108 retrieves the type and the storage location from the record found in block 616. Block 622-2 may be followed by block 630.

In block 624-3, filesystem 108 determines if the write file command attempts to read a directory instead of a file. For example, filesystem 108 determines if the variable path_info has two blank values, i.e., path_info[0] and path_info[1] are equal. If so, block 624-3 may be followed by block 642-3 to raise an error as the requester is attempting to read a directory with a write file command. Otherwise, block 624-3 may be followed by block 626-2.

In block 626-2, filesystem 108 determines the storage location, type, and uuid of the second element in the path. Block 626-2 may be followed by block 630.

In block 630, filesystem 108 determines if the second element's type is equal to directory. If so, block 630 may be followed by block 642-3 to raise an error as the requester is attempting to read a directory instead of a file. Otherwise, block 630 may be followed by block 638-3.

In block 638-3, filesystem 108 reads the file from the storage location using the second element's uuid as the filename. Block 638-2 may be followed by block 646, which ends method 600.

In block 642-3, filesystem 108 raises an error saying it cannot read a directory. Block 642-3 may be followed by block 646, which ends method 600.

To illustrate method 800, assume a program issues a read file command 204 (FIG. 2) to a NFS share 118, which is captured with the records of database 214 in FIG. 9 and illustrated with a directory structure 1000 of FIG. 9. For example, the read file command wishes to read a (first) file 1002 named "file1" having an absolute (first) path 1004 of "/dir1/dir3/dir4/dir5/file1". If a relative path is received, host OS commands may be used to convert it to an absolute path. In the path, directory and file names are separated by a forward slash (/), which depicts a level, and the root level starts with a "/". Other directory structure conventions may be used. To illustrate method 800 would read the correct file, NFS share 118 is provided with another file 1006 named "file1" having a different absolute path 808 of "/dir2/dir3/dir4/dir5/file1". Note paths 1004 and 1108 have directories with the same names.

In block 602, filesystem 108 reads the path in the read file command. In block 604, filesystem 108 parses " " (i.e., a blank value), "dir1", "dir3", "dir4", "dir5", and "file1" from the path and stores these values in the variable path_info. In block 606, filesystem 108 determines the length of the variable path_info is not equal to two (2) so the last element in the path is not located in the root directory of NFS share 118. Thus, block 606 is followed by block 608. In block 608, filesystem 108 queries database 214 for a record of an element having (1) a parent name equal to root (or a p_uuid equal to NULL) and (2) a name equal to the second value in the variable path_info (dir1). Database 214 returns a record 902, and filesystem 108 retrieves directory dir1's uuid from the record. Note that database 214 does not return a record 903, which has a different name but the same parent. In block 610, filesystem 108 sets the variable element_uuid equal to directory dir1's uuid. In block 612, filesystem 108 assigns all but the first two values (root and dir1) from the variable path_info into the variable updated_path_info.

In a first iteration, in block 614-2, filesystem 108 sets the variable element_name equal to the next value in the variable updated_path_info (dir3). In block 616, filesystem 108 queries database 214 for a record of an element having (1) a p_uuid equal to the variable element_uuid (dir1's uuid) and (2) a name equal to the variable element_name (dir3). Database 214 returns a record 904, and filesystem 108 retrieves directory dir3's uuid from the record. Note that database 214 does not return a record 905, which has the same name but a different parent. In block 618, filesystem 108 sets the variable element_uuid equal to the current element's uuid (dir3's uuid). In block 620-2, filesystem 108 determines the variable element_name (dir3) is not equal the last element of the variable updated_path_info (file1) so filesystem 108 has not determined the uuid of the last element in the path. Thus, block 620-2 loops back to block 614-2 for a second iteration.

In a second iteration, in block 614-2, filesystem 108 sets the variable element_name equal to the next value in the variable updated_path_info (dir4). In block 616, filesystem 108 queries database 214 for a record of an element having (1) a p_uuid equal to the variable element_uuid (dir3's uuid) and (2) a name equal to the variable element_name (dir4). Database 214 returns a record 906, and filesystem 108 retrieves directory dir4's uuid from the record. Note that database 214 does not return a record 907, which has the same name but a different parent. In block 618, filesystem 108 sets the variable element_uuid equal to the current element's uuid (dir4's uuid). In block 620-2, filesystem 108 determines the variable element_name (dir4) is not equal the last element of the variable updated_path_info (file1) so filesystem 108 has not determined the uuid of the last element in the path. Thus, block 620-2 loops back to block 614-2 for a third iteration.

In a third iteration, in block 614-2, filesystem 108 sets the variable element_name equal to the next value in the variable updated_path_info (dir5). In block 616, filesystem 108 queries database 214 for a record of an element having (1) a p_uuid equal to the variable element_uuid (dir4's uuid) and (2) a name equal to the variable element_name (dir5). Database 214 returns a record 908, and filesystem 108 retrieves directory dir5's uuid from the record. Note that database 214 does not return a record 909, which has the same name but a different parent. In block 618, filesystem 108 sets the variable element_uuid equal to the current element's uuid (dir5's uuid). In block 620-2, filesystem 108 determines the variable element_name (dir5) is not equal the last element of the variable updated_path_info (file1) so filesystem 108 has not determined the uuid of the last element in the path. Thus, block 620-2 loops back to block 614-2 for a fourth iteration.

In a fourth iteration, in block 614-2, filesystem 108 sets the variable element_name equal to the next value in the variable updated_path_info (file). In block 616, filesystem 108 queries database 214 for a record of an element having (1) a p_uuid equal to the variable element_uuid (dir5's uuid) and (2) a name equal to the variable element_name (file1). Database 214 returns a record 910, and filesystem 108 retrieves directory file's uuid from the record. Note that database 214 does not return a record 911, which has the same name but a different parent. In block 618, filesystem 108 sets the variable element_uuid equal to the current element's uuid (file1's uuid). In block 620-2, filesystem 108 determines the variable element_name (file1) is equal the last element of the variable updated_path_info (file1). Thus, block 620-2 is followed by block 622-2.

In block 622-2, filesystem 108 retrieves the type (file) and the storage location (local2) from record 910. In block 630, filesystem 108 determines the type (file) is not equal to directory. Thus, block 630 is followed by block 638-3. In block 638-3, filesystem 108 reads the file having a file name equal to the uuid in record 910 from the storage location (local2) in record 910. Filesystem 108 replaces the file's uuid filename with the name (file1) in the path or record 910, and returns the file to the requester. Block 646 ends method 600.

To delete a file, filesystem 108 uses method 700 or 800 to find the file's record in database 214, retrieves the file's UUID and storage location, deletes the file, and deletes the record.

Method 600, 700, and 800 may be used to create, read (list), and remove a directory.

To create a directory, filesystem 108 creates a record for the directory in database 214. The create directory command includes a path. Filesystem 108 uses method 600 to find the UUID of the directory's parent in the path to fill the p_uuid field in the directory's record. As described above, for each pair of consecutive element, filesystem 108 compares the first element's UUID and the second element's name against the p_uuid and the name fields of the records in database 214 to find a matching record and determine the UUID of the second element from the matching record. The process repeats until the second-to-last pair of consecutive elements in the path is processed.

To read (list) a directory, filesystem 108 uses method 700 or 800 to find the UUID of the exact directory which requester wishes to read (list). As described above, for each pair of consecutive element in the path, filesystem 108 compares the first element's UUID and the second element's name against the p_uuid and the name fields of the records in database 214 to find a matching record and determine the UUID of the second element from the matching record. The process repeats until the last pair of consecutive elements in the path is processed. Next, filesystem 108 queries database 214 for all such elements having p_uuid fields that match the UUID of the requested directory and return these elements to the requester.

To remove a directory, filesystem 108 uses method 700 or 800 to find the directory's record in database 214 and retrieves the directory's UUID, and deletes the record. As described above, for each pair of consecutive element in the path, filesystem 108 compares the first element's UUID and the second element's name against the p_uuid and the name fields of the records in database 214 to find a matching record and determine the UUID of the second element from the matching record. The process repeats until the last pair of consecutive elements in the path is processed. Next, filesystem 108 finds all records that have p_uuid fields matching the directory's UUID, retrieves their UUIDs, and delete these records. The process is repeated until no off-spring (directory or file) of the deleted directory can be found.

Figures 1, 11:
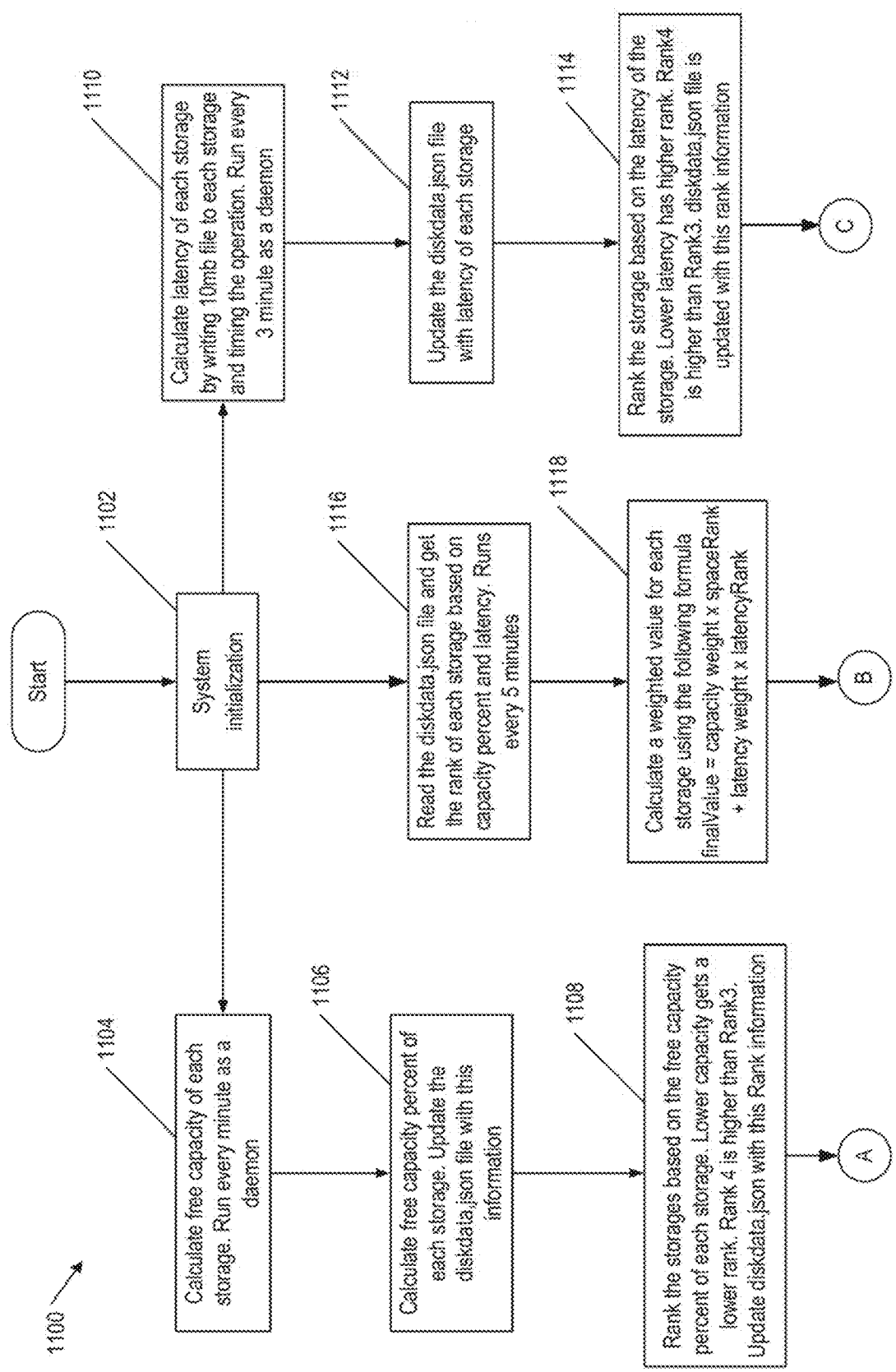
Figures 2, 11:
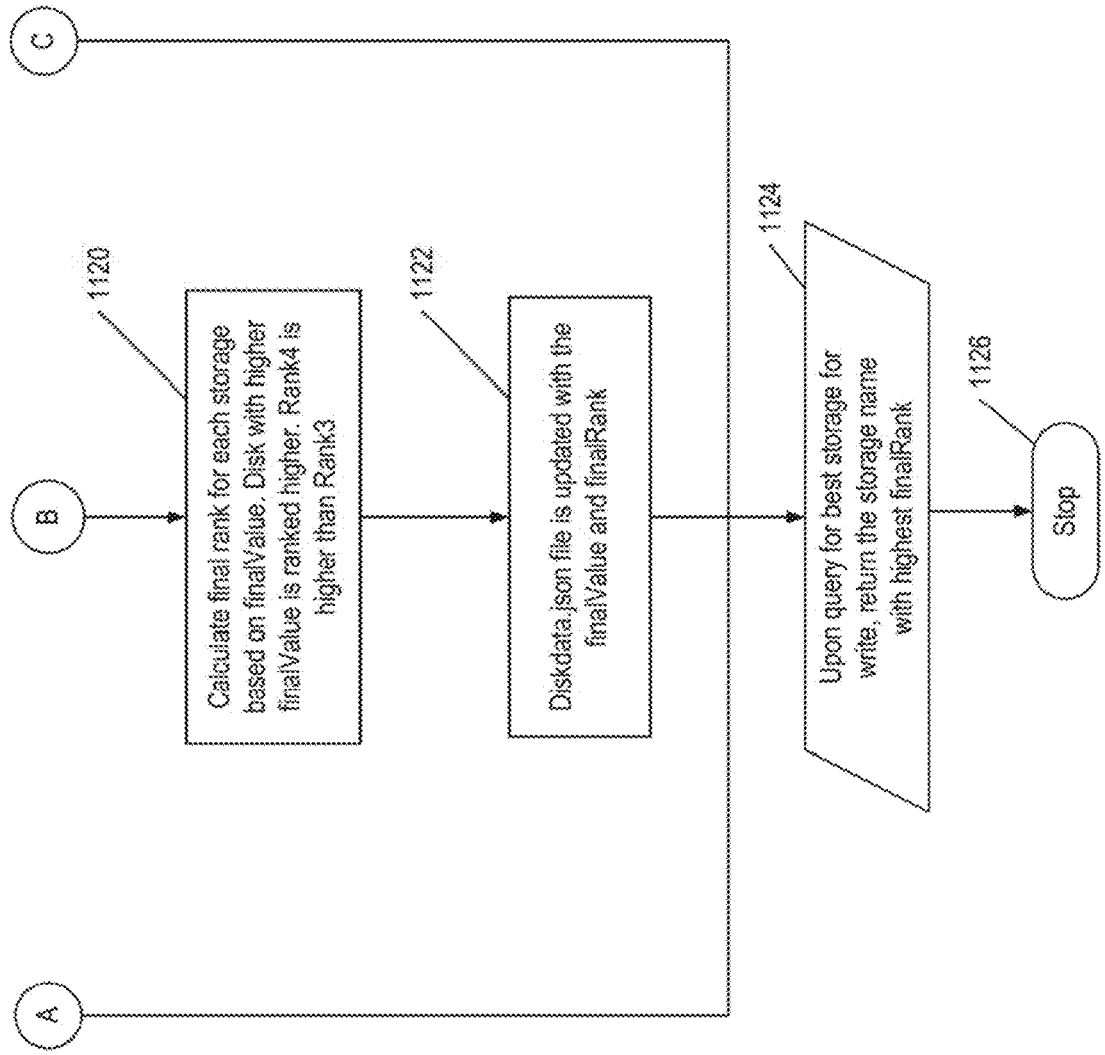

FIG. 11 a block diagram of a method 1100 for storage selection engine 112 to select the best performing storage 102 for a write file command to a NFS share 118 (FIG. 1) in examples of the present disclosure. Method 1100 may begin in block 1102.

In block 1102, storage selection engine 112 initializes. Storage selection engine may initialize capacity, latency, and ranking records for storages 102 (FIG. 1) in a data file 216 (FIG. 2), such as a JavaScript Object Notation (JSON) file. Note that storages 102 have been previously selected through Admin UI 122. Fields in data file 216 include:
1) finalRank: The final rank of a storage;
2) finalValue: The final weighted value for the storage;
3) freePercent: Percent of free space available in the storage;
4) freeSpace: Free space available in the storage;
5) latency: Latency of the storage;
6) latencyRank: Rank of the storage per latency;
7) spaceRank: Rank of the storage per freePercent;
8) totalSpace: Total available space in the storage; and
9) usedSpace: Used space in the storage.

FIG. 12 shows a table 1200 of records in data file 216 that capture the storage capacities of storages 102 in examples of the present disclosure. For each storage, storage selection engine 112 may initialize its record with its total capacity and writable capacity minus read cache. FIG. 13 shows a table 1300 of records in data file 216 that capture the latencies of storages 102 in examples of the present disclosure. FIG. 14 shows a table 1400 of records in data file 216 that capture the final rankings of storages 102 in examples of the present disclosure. Referring to FIG. 11, block 1102 may be followed by three sub-processes.

In a first sub-process starting at block 1104, storage election engine 112 calculates the free space of each storage 102. This part of storage election engine 112 may be implemented by a daemon that runs periodically to determine the free capacities of storages 102 and update data file 216. Block 1104 may be followed by block 1106.

Figure 10:
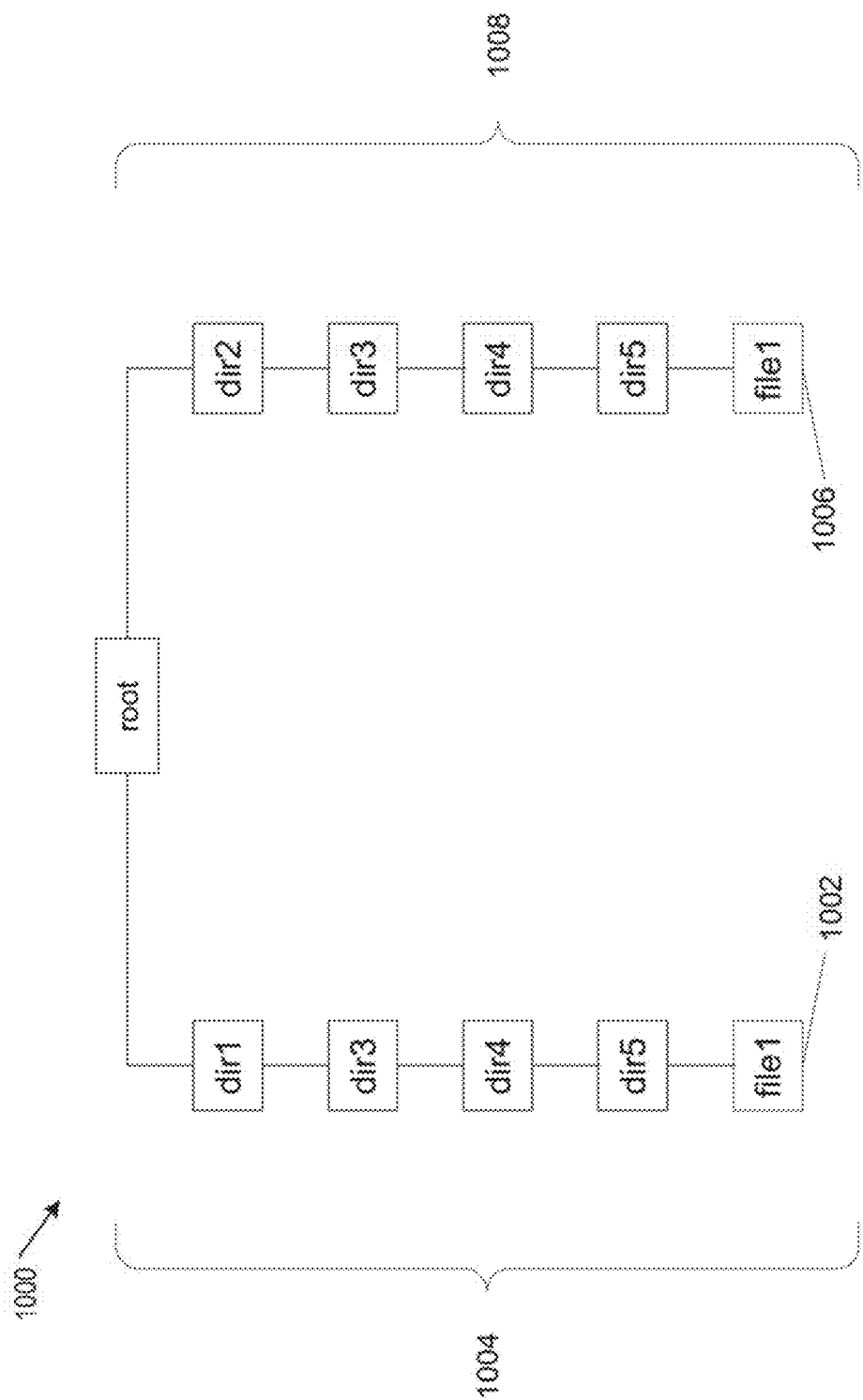
FIG. 10 shows a directory structure corresponding to the records of FIG. 6 in examples of the present disclosure.

In block 1106, storage election engine 112 calculates the free space of each storage 102 as a percentage of the writable capacity of the storage. Storage election engine 112 writes the free space percentages of storages 102 in the records 1000 (FIG. 10) of data file 216. Referring back to FIG. 11, block 1106 may be followed by block 1108.

In block 1108, storage selection engine 112 ranks storages 102 based on their free space percentages. Storage selection engine 112 writes or updates the rankings of storages 102 in table 1000 (FIG. 10) of data file 216.

Storage selection engine 112 uses free space percentage instead of writable capacity to rank storages 102. Consider the following example: a one (1) gigabyte (GB) file is to be written, server has three underlying storages 102 of size 10 GB, 20 GB, and 50 GB, and each storage currently stores five (5) GB of data. Thus, the writable capacity in the 10 GB is five (5) GB, the writable capacity in the 20 GB storage is 15 GB, and the writable capacity in the 50 GB storages is 45 GB. The free space percentage in the 10 GB is 50%, the free space percentage in the 20 GB storage is 75%, and the free space percentage in the 50 GB storages is 90%. If storage selection engine 112 considers writeable capacity, then all writes will go to the 50 GB storage until its writable capacity is reduced to 15 GB (same as the 20 GB storage). On the other hand, if storage selection engine 112 considers writ-able capacity percentage, then all writes will go to the 50 GB storage until its writable capacity is reduced to 37.5 GB and its free space percentage is reduced to 75% (same as the 20 GB storage). Thus, using free space percentage leads to better distribution and balance of data across storages 102.

Referring back to FIG. 11, block 1108 may be followed by block 1124.

In a second sub-process starting at block 1110, storage election engine 112 calculates the latency of each storage 102. This part of storage election engine 112 may be implemented by a daemon that runs periodically to determine the latencies of storages 102. The daemon may write the same file of a known size to each storage 102 and time the write to determine the latency of the storage. Block 1110 may be followed by block 1112.

In block 1112, storage election engine 112 updates the latencies of storages 102 in table 1300 (FIG. 13) of data file 216. Referring back to FIG. 11, block 1112 may be followed by block 1114.

In block 1114, storage selection engine 112 ranks storages 102 based on their latencies. Storage selection engine 112 writes or updates the rankings of storages 102 in table 1300 (FIG. 13) of data file 216. Referring back to FIG. 11, block 1108 may be followed by block 1124.

In a third sub-process starting at block 1116, storage selection engine 112 reads data file 216 to periodically retrieve the capacity and the latency rankings of storages 102. This part of storage election engine 112 may be implemented by a daemon that runs periodically to retrieve the capacity and the latency rankings of storages 102. Block 1116 may be followed by block 1118.

In block 1118, storage selection engine 112 calculates a weighted ranking for each storage 102. For example, storage selection engine 112 uses the following formula: finalValue=capacity weight×spaceRank+latency weight×latencyRank. Block 1118 may be followed by block 1120.

In block 1120, storage selection engine 112 ranks storages 102 based on their weighted ranking. Block 1120 may be followed by block 1122.

In block 1122, storage selection engine 112 writes or otherwise updates the final rankings of storages 102 in table 1400 (FIG. 14) of data file 216. Block 1122 may be followed by block 1124.

In block 1124, storage selection engine 112 responds to a query from filesystem 108 (FIG. 2) for the best performing storage 102 by returning the storage 102 having the highest final ranking in table 1400 (FIG. 14).

Note that initially, all storages 102 have 100% free space percentage so latency becomes the decisive criterion. Similarly, when the free space percentage of two or more storages 102 are equal, latency becomes the decisive criterion.

As an alternative to method 12, storage selection engine 12 may select a storage with the lowest latency.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for a server, comprising:
mounting storage devices at mount points in a native filesystem, the storage devices comprising on-premises and cloud storage devices;
periodically ranking the mounted storage devices;
exporting a single mount point, which corresponds to a directory in the native filesystem, as a share to a client machine, wherein the single mount point is generated based on the mount points;
receiving a request to create a file under the share;
in response to the request, creating the file under the share by:
selecting a highest-ranking mounted storage device as a selected storage;
storing information about the file in a database, including the selected storage as its storage location; and
writing the file with a unique identifier as its file name in a root directory of the selected storage; and
in response to receiving an additional request to read or remove the directory, or to read, write or remove the file:
parsing element names in a path of the directory; and
recursively matching every pair of consecutive elements in the path to a pair of parent and element in a record of the database.

2. The method of claim 1, wherein said periodically ranking the mounted storage devices comprises periodically ranking the mounted storage devices based on usage and latency.

3. The method of claim 2, wherein said periodically ranking the mounted storage devices based on usage and latency comprises periodically assigning a rank to each mounted storage device based on a sum of a weighted free space rank and a weighted latency rank.

4. The method of claim 3, wherein said periodically ranking the mounted storage devices based on usage and latency further comprises periodically determining a free space percentage of each mounted storage device and assigning a free space rank to each mounted storage device based on its free space percentage.

5. The method of claim 3, wherein said periodically ranking the mounted storage devices based on usage and latency further comprises periodically determining a latency of each mounted storage device and assigning a latency rank to each mounted storage device based on its latency.

6. The method of claim 5, wherein said periodically determining a latency of each mounted storage device comprises periodically timing a write of a same file to each mounted storage device.

7. The method of claim 1, further comprising:
receiving another request to make a new directory under the share;
in response to the another request, making the new directory under the share by storing information about the new directory in the database, wherein said storing information about the new directory in the database and said storing information about the file in the database comprise, for each element, creating a record including:
the element's name;
the element's type selected from directory and file;
a parent element's name;
the element's storage location selected from the mounted storage devices;
the element's unique identifier;
the parent element's unique identifier; and
the element's access mode.

8. The method of claim 7, wherein said storing information about the new directory in the database further comprises:
storing a second element of the last matched pair as the parent element in the record for the directory,
wherein the every pair of consecutive elements comprises a first element's identifier and a name of the second element of consecutive elements and the recursively matching every pair is up to and including the second-to-last matched pair.

9. The method of claim 7, further comprising:
querying the database for elements having a second element of the last matched pair as their parent element; and
returning a list of the elements having the second element of the last matched pair as their parent element, wherein the recursively matching every pair is up to and including the last matched pair.

10. The method of claim 9, wherein said returning a list of the elements having the last matched pair's second element as their parent element comprises returning each element with its name from its record in the database.

11. The method of claim 7, further comprising:
removing the record for a second element of the last matched pair from the database, wherein the recursively matching every pair is up to and including the last matched pair.

12. The method of claim 7, wherein said storing information about the file in the database further comprises:
parsing element names in a path of the directory;
recursively matching every pair of consecutive elements in the path to a pair of parent and element in a record of the database, up to and including the second-to-last matched pair; and
storing a second element of the last matched pair as the parent element in the record for the file.

13. The method of claim 7, further comprising:
returning a second element of the last matched pair, wherein the recursively matching every pair is up to and including the last matched pair.

14. The method of claim 13, wherein said returning the second element of the last matched pair comprises returning the file with its name from its record in the database.

15. The method of claim 7, further comprising:
removing a second element of the last matched pair from its storage location and the record for the second element of the last matched pair from the database, wherein the recursively matching every pair is up to and including the last matched pair.

16. A server, comprising:
a native filesystem;
storages mounted at mount points in the native filesystem, the storages comprising on-premises and cloud storages;
a processor;
a computer-readable medium encoded with instructions executable by the processor to perform a method comprising:
periodically ranking the mounted storage devices;
exporting a single mount point, which corresponds to a directory in the native filesystem, as a share to a client, wherein the single mount point is generated based on the mount points;
receiving a request to create a file under the share; and
in response to the request, creating the file under the share by:
selecting a highest-ranking mounted storage device as a selected storage;
storing information about the file in a database, including the selected storage as its storage location; and
writing the file with a unique identifier as its file name in a root directory of the selected storage;
in response to receiving an additional request to read or remove the directory, or to read, write or remove the file:
parsing element names in a path of the directory; and
recursively matching every pair of consecutive elements in the path to a pair of parent and element in a record of the database.

17. The server of claim 16, wherein the periodically ranking the mounted storage devices is based on usage and latency by assigning a rank to each mounted storage device based on a sum of a weighted value of a free space rank and a weighted value of a latency rank.

18. The server of claim 17, wherein the periodically ranking the mounted storage devices further comprises periodically determining a free space percentage of each mounted storage device and assigning a free space rank to each mounted storage device based on its free space percentage.

19. The server of claim 17, wherein the periodically ranking the mounted storage devices further comprises periodically determining a latency of each mounted storage device and assigning a latency rank to each mounted storage device based on its latency.

20. A non-transitory, computer-readable storage medium encoded with instructions executable by a processor to implement a file-based filesystem, the instructions comprising:
exporting a directory in a native filesystem as a share;
periodically ranking storages mounted at the native file system, the storages comprising on-premises and cloud storages;
receiving a request to create a file under the share;
in response to the request, creating the file under the share by:
selecting a highest-ranking mounted storage device as a selected storage;
storing information about the file in a database, including the selected storage as its storage location; and
writing the file with a unique identifier as its file name in a root directory of the selected storage; and
in response to receiving an additional request to read or remove the directory, or to read, write or remove the file:
parsing element names in a path of the directory; and
recursively matching every pair of consecutive elements in the path to a pair of parent and element in a record of the database.

\* \* \* \* \*